United States Patent [19]  [11] Patent Number: 4,544,522
Curulla et al.  [45] Date of Patent: Oct. 1, 1985

[54] NUCLEAR FUEL ASSEMBLY SPACER

[75] Inventors: Michael V. Curulla, San Jose, Calif.;
John F. Price, Wilmington, N.C.;
Bruce Matzner, San Jose, Calif.;
Kenneth W. Brayman, San Jose,
Calif.; Frank D. Qurnell, San Jose,
Calif.

[73] Assignee: General Electric Company, San Jose, Calif.

[21] Appl. No.: 409,946

[22] Filed: Aug. 20, 1982

[51] Int. Cl.⁴ .............................................. G21C 3/34
[52] U.S. Cl. .................................. 376/441; 376/442; 376/444
[58] Field of Search ................ 376/441, 462, 438, 444

[56] References Cited

U.S. PATENT DOCUMENTS

| 3,298,922 | 1/1967  | Prince et al. | 376/441 |
| 3,340,341 | 9/1967  | Bradel | 376/438 X |
| 3,350,275 | 10/1967 | Venier et al. | 376/438 X |
| 3,365,371 | 1/1968  | Lass et al. | 376/452 X |
| 3,431,170 | 3/1969  | Lass et al. | 376/446 X |
| 3,431,171 | 3/1969  | Glandin | 376/438 |
| 3,442,763 | 5/1969  | Chetter et al. | 376/441 X |
| 3,654,077 | 4/1972  | Lass et al. | 376/442 |
| 3,802,995 | 4/1974  | Fritz et al. | 376/446 X |
| 4,155,807 | 5/1979  | Schreiber et al. | 376/438 |
| 4,312,705 | 1/1982  | Steinke | 376/441 |
| 4,313,797 | 2/1982  | Attix | 376/441 |
| 4,314,884 | 2/1982  | Fanning et al. | 376/441 |
| 4,364,902 | 12/1982 | Feutrel | 376/441 |

FOREIGN PATENT DOCUMENTS

| 0033263 | 8/1981  | European Pat. Off. | 376/441 |
| 1764046 | 4/1971  | Fed. Rep. of Germany . | |
| 2137158 | 4/1972  | Fed. Rep. of Germany . | |
| 2644297 | 4/1978  | Fed. Rep. of Germany . | |
| 3038379 | 4/1981  | Fed. Rep. of Germany . | |
| 2337407 | 12/1975 | France | 376/438 |
| 2366669 | 4/1978  | France | 376/441 |
| 0335770 | 6/1971  | Sweden . | |
| 1129103 | 10/1968 | United Kingdom . | |

Primary Examiner—Peter A. Nelson
Assistant Examiner—Daniel Wasil
Attorney, Agent, or Firm—Ivor J. James; Samuel E. Turner; Raymond G. Simkins

[57] ABSTRACT

A spacer for use in a fuel assembly of a nuclear reactor having thin, full-height divider members, slender spring members and laterally oriented rigid stops and wherein the total amount of spacer material, the amount of high neutron cross section material, the projected area of the spacer structure and changes in cross section area of the spacer structure are minimized whereby neutron absorption by the spacer and coolant flow resistance through the spacer are minimized.

3 Claims, 13 Drawing Figures

NUCLEAR FUEL ASSEMBLY SPACER

BACKGROUND

Nuclear power reactors are well known and are discussed, for example, by M. M. El-Wakil in "Nuclear Power Engineering" McGraw-Hill Book Company Inc., 1962.

In a known type of nuclear power reactor, for example, as used in the Dresden Nuclear Power Station near Chicago, Ill., the reactor core is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle as shown, for example, in U.S. Pat. No. 3,431,170. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel assembly is formed by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the rods in spaced position and restrain them from bowing and vibrating during reactor operation. A plurality of fuel rod spacers spaced along the length of the fuel assembly are provided for this purpose.

Design considerations of such fuel rod spacers include the following: retention of rod-to-rod spacing; retention of fuel assembly shape; allowance for fuel rod thermal expansion; restriction of fuel rod vibration; ease of fuel bundle assembly; minimization of contact areas between the spacer and fuel rods; maintenance of structural integrity of the spacer under normal and abnormal (such as seismic) loads; minimization of reactor coolant flow distortion and restriction; maximization of thermal limits; minimization of parasitic neutron absorption; minimization of manufacturing costs including adaptation to automated production. Thus the need to provide such fuel rod spacers creates several significant problems two of which are parasitic neutron absorption and coolant flow restriction or pressure drop.

Any material, in addition to the nuclear fuel, that must be used in the construction of the reactor core unproductively absorbs neutrons and thus reduces reactivity with the result that an additional compensating amount of fuel must be provided. The amount of such parasitic neutron absorption is a function of the amount of the non-fuel material, of its neutron absorption characteristics, that is, its neutron absorption cross section, and of the neutron flux density to which it is exposed.

To remove the heat from the nuclear fuel, pressurized coolant is forced through the fuel assemblies of the reactor core. The fuel rod spacers in the assemblies act as coolant flow restrictors and cause an undesirable though inevitable coolant flow pressure drop. To maintain proper cooling of the fuel rods along their length and to minimize the required coolant pumping power it is desirable that spacer coolant flow resistance be minimized. The flow resistance of a spacer is a strong function of its projected or "shadow" area. Therefore, the flow resistance of a spacer can be minimized by minimizing the projected area of the structure of the spacer.

As a practical matter the desire to minimize both parasitic neutron absorption and coolant flow restriction presents a conflict in fuel rod spacer design.

To minimize coolant flow restriction, spacer members should be thin and of minimal cross section area. However, very thin members must be formed of high strength material to provide suitable spacer strength. Also, high strength material with suitable resilience characteristics must be used for any spring member portions of the spacer. It is found that suitable such materials have relatively high neutron absorption characteristics.

On the other hand, materials of desirably low neutron absorption characteristics are found to be of relatively low strength, difficult to form and lacking the resiliency desired for the spring member portions of the spacer.

An approach toward the resolution of the foregoing design conflict is a "composite" spacer wherein the structural members are formed of a material having a low neutron absorption cross section and the spring members thereof are separately formed of suitably resilient material whereby the amount of high neutron absorption cross section material is minimized.

A variety of such fuel rod spacers have been proposed and used. An example is shown in U.S. Pat. No. 3,654,077. The spacer shown therein (especially the embodiment of FIGS. 5 and 6 thereof) has enjoyed long commercial success. In the spacer thereof the peripheral support member and the divider members are formed of low neutron cross section material such as zirconium. The divider members are skeletonized, i.e., formed with cutouts, to further reduce neutron loss. To minimize the amount of high neutron cross section spring material in the spacer, a single spring member projects into each of the fuel rod passages, the springs being in the form of four-sided assemblies.

The core of a large nuclear power reactor typically contains in the order of 800 fuel assemblies each of which may have seven spacers. Thus it can be appreciated that even small decreases in spacer flow resistance and neutron capture can have a significant effect on the core as a whole.

Decreased flow resistance means that less coolant recirculation pumping power is needed. For example, in a 1000 MWe (megawatt electric) plant, a reduction of core flow resistance of one psi can save as much as 350 kWe of power.

Decreased parasitic neutron absorption in the spacers means that less core reactivity is needed for a given power output. In other words, fuel of lower enrichment can be used. For example, a 0.01 percent decrease in enrichment can lower the cost of the fuel by in the order of $1000.00 per assembly.

An object of this invention is a nuclear fuel element spacer providing decreased coolant flow resistance and decreased neutron absorption.

Another object is to decrease the projected area of a spacer structure.

Another object is to minimize changes in the cross section area of the spacer structure.

Another object is to securely retain the spring members of a spacer.

Another object is to avoid projection of springs or other spacer structure above and below the planes formed by the upper and lower edges of the cross-laced divider members of the spacer.

SUMMARY

These and other objects of the invention are achieved by a spacer wherein cross-laced divider members are supported within a peripheral support band to provide fuel rod passages. Both are formed of low neutron cross section material. The divider members are relatively thin with plane surfaces, except for rigid projections formed near their edges, to minimize projected area and are devoid of cutouts or openings to avoid creating turbulence in the coolant flow through the spacer.

The rods or elements extending through the passages of the spacer are centered and laterally supported between relatively rigid stops and resilient members. The rigid projections or stops may take the form of arched portions near the upper and lower edges of the divider members. Preferably, these arched portions are laterally oriented for least disturbance of coolant flow and minimization of projected area.

The resilient members may take the form of slender, continuous loop springs of generally elliptical shape supported on the divider members, the two sides of each spring member projecting into adjacent fuel rod passages.

In one embodiment of the invention, the springs are positioned in proper position on a divider member and are retained in position by projections or louvers formed in the divider member adjacent each side of each end of each spring.

In another embodiment, the springs are retained in position by engagement with notches in the upper and lower edges of the divider member. To form such an arrangement, the divider bar is longitudinally split, i.e., formed of an upper and a lower piece. After the springs are positioned in engagement with the notches the inner edges of the upper and lower pieces are placed in abutting relationship and welded together to form a unified divider member.

Except for the flow channel lead in tabs projecting upward and inward from the peripheral support band, there are no springs or other spacer members projecting beyond the upper and lower lateral planes defined by the upper and lower edges of the divider members of the spacer. This aids in avoiding turbulence producing changes in cross section area of the structures of the spacer.

DRAWING

The invention is described more specifically hereinafter with reference to the accompanying drawing wherein.

DESCRIPTION

Figure 1:
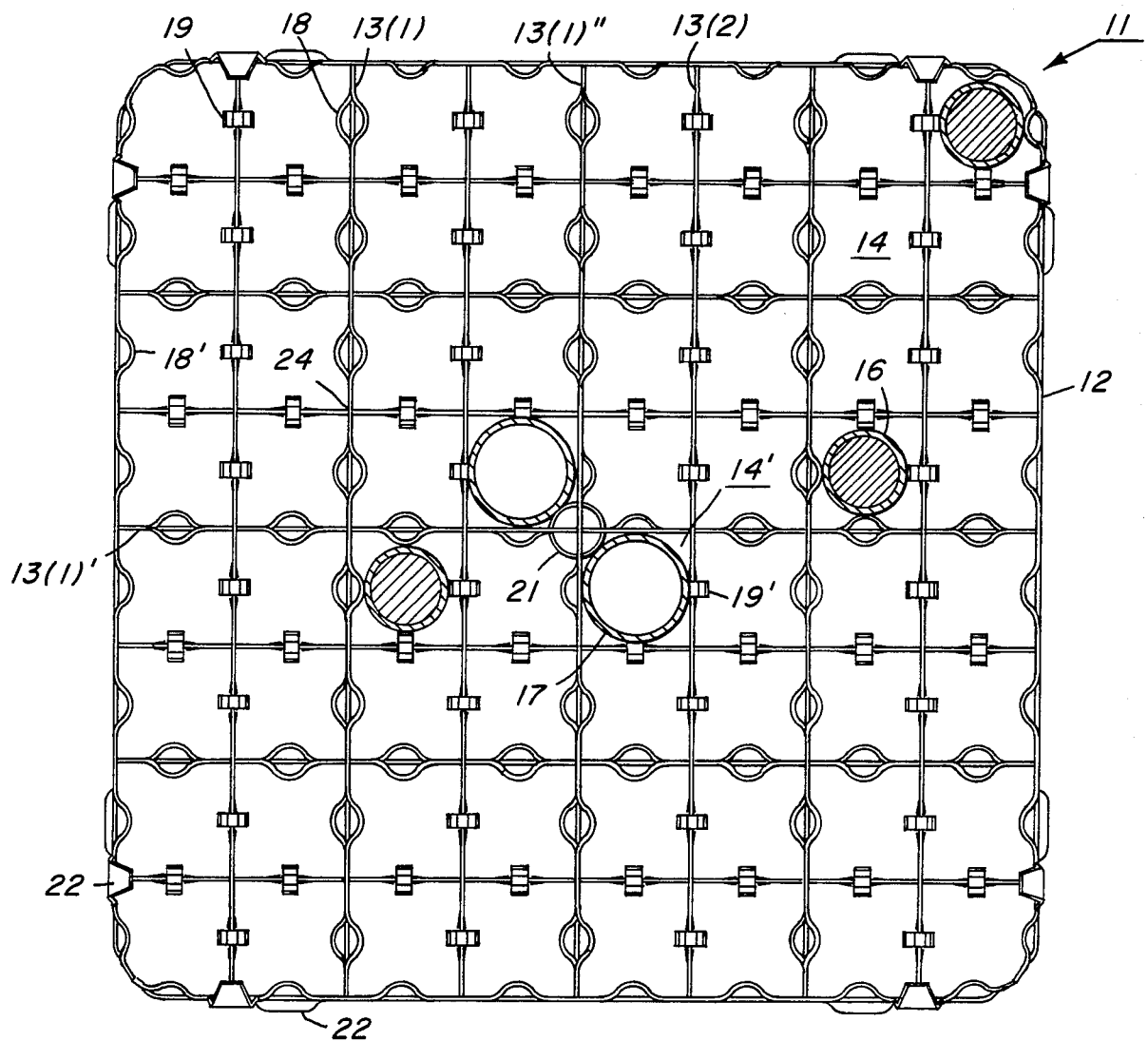
FIG. 1 is a plan or top view of the fuel rod spacer of the invention.
Figure 2:
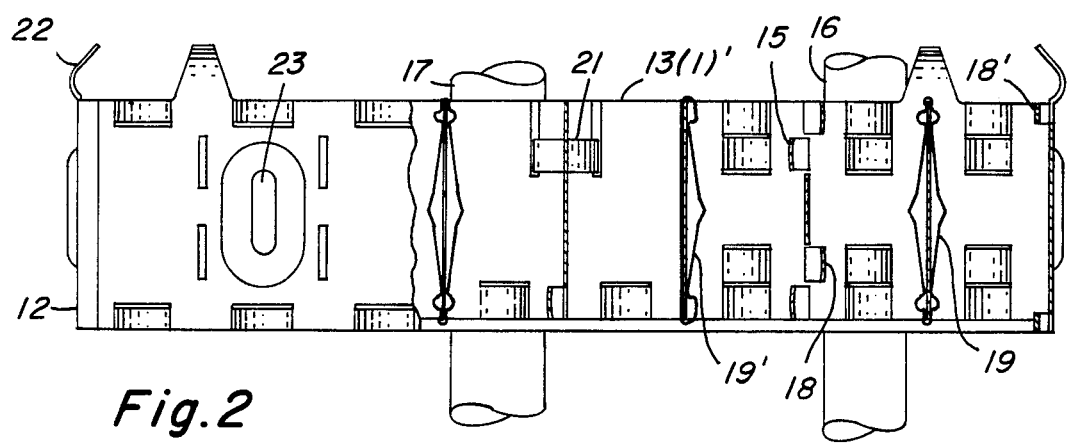
FIG. 2 is an elevation view partly in section of the spacer of FIG. 1.

The spacer 11 of the invention is shown generally in the plan view of FIG. 1 and the partly cutaway elevation view of FIG. 2. The spacer 11 is formed of a peripheral support band 12 to which are secured a plurality of sheet metal divider members 13(1) and 13(2) in a cross-laced or egg crate like arrangement to provide fuel rod passages 14 for fuel rods 16. (Conveniently, the peripheral support band 12 may be formed of four separate side pieces welded together at the corners after assembly with the divider members.) One or more passages 14' may be provided to accommodate coolant-moderator conducting tubes 17 which are larger in diameter than the fuel rods 16. (Such water tubes and their function are discussed in U.S. Pat. Nos. 3,802,995 and 4,314,884.)

The divider members 13(1) are formed with a pair of arched portions near their upper and lower edges to provide relatively rigid projections or stops 18 for engagement with and lateral location of the fuel rods 16 in the passages 14. Preferably the stops 18 are laterally oriented to minimize spacer projected area and coolant flow resistance. Similar laterally oriented stops 18' are formed along the upper and lower edges of the peripheral support band 12 for support of the fuel rods in the peripheral ones of the fuel rod passages 14.

The upper and lower edges 15 (FIG. 2) of the rigid stops 18, 18' are curved slightly outward from the passages 14 (i.e., the stops are slightly convex in the vertical direction) to facilitate entry into and removal from the passages 14 of the fuel rods 16 and to minimize scratching of the fuel rods during rod insertion.

The divider members 13 (2) support separately formed, two-sided springs 19 (discussed in more detail hereinafter). The divider members 13(1), 13(2) are alternately positioned so that two intersecting divider members 13(1) and two intersecting divider members 13(2) bound each one of the fuel rod passages 14 (except where the peripheral passages are bounded by the peripheral support band 12). Thus a side of each of two of the springs 19 projects into each passage 14 from two adjacent sides thereof and urges the fuel rod therein into contact with rigid stops 18 on the other two adjacent sides of the passage.

As illustrated in FIG. 1, the spacer 11 provides two diagonally adjacent passages 14' for two water tubes 17. To maximize the permissible diameter of the water tubes 17, rigid stops 18 are omitted in the passages 14'. Also, springs 19' (FIG. 2) with only one resilient side are used at spring positions adjacent the passages 14'. In lieu of springs 19 in these passages, resilient lateral support of the water tubes 17 is provided by a ring shaped spring member 21 secured in appropriate slots in the intersecting divider members 13(1)' and 13(1)" bounding two sides of the passages 14' as described hereinafter.

The peripheral support band 12 of the spacer 11 is formed with a pair of inwardly curved, upward projections 22 near each corner to serve as lead-ins when a removable tubular flow channel is installed over the fuel assembly of which this spacer is a part. (See flow channel 11 of FIG. 1 of U.S. Pat. No. 3,654,077). It is a feature of the invention that, except for the lead-in projections 22, there are no springs or other spacer structure projecting above or below the planes of the upper and lower edges of the divider members 13(1), 13(2) whereby coolant flow disturbances due to velocity changes caused by changes in spacer cross-section area are minimized.

The peripheral support band 12 also is formed with a pair of outwardly extending lobes 23 near each corner for providing predetermined spacing between the support band 12 and a surrounding tubular coolant flow channel (not shown herein).

The divider members 13(1), 13(2) are welded together at the top and bottom of each of their intersections 24 for increased spacer strength.

Figure 3A:
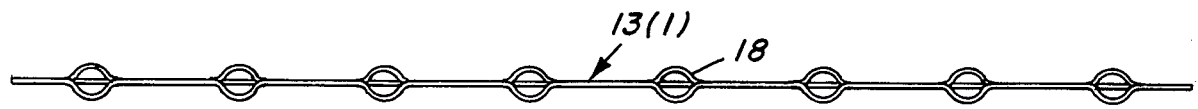
FIGS. 3A and 3B are top and side views of one type of divider member of the spacer of FIGS. 1 and 2.
Figure 3B:
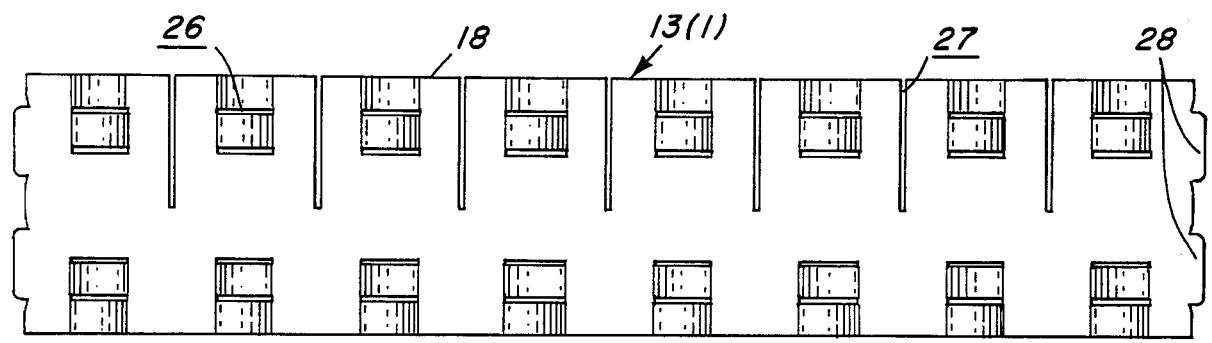

Details of divider members 13(1) are illustrated in FIGS. 3A, 3B. These divider members provide the rigid projections or stops 18. To form such stops, the divider member 13(1) is first formed with appropriately located vertically aligned sets of lateral slits 26. The metal between the slits 26 and the upper and lower edges of member 13(1) and between the upper and lower slits of each pair is then deformed outwardly to form the laterally arched stops 18 projecting as vertically aligned pairs from each side of the divider member 13(1). (The rigid stops 18' along the upper and lower edges of the peripheral support band 12 may be formed in a similar manner.)

Each divider member 13(1) is formed with regularly spaced vertical slots 27 for interlocking with other divider members of the spacer in egg-crate fashion.

Formed at the ends of each divider member 13(1) are spaced pairs of tabs 28. These tabs are welded into appropriate slots in the peripheral support band 12 for location and support of the divider member therein.

Figure 4A:
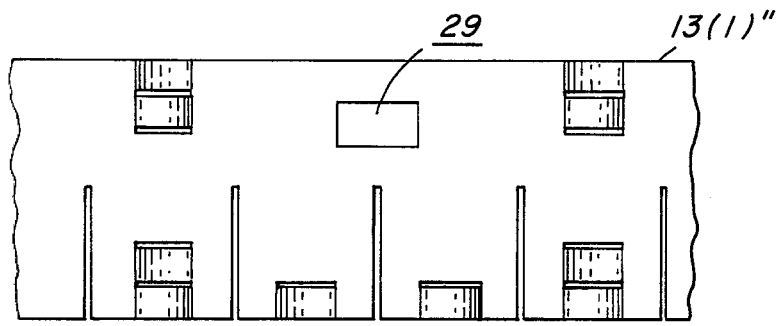
FIGS. 4A and 4B are detail views of divider member modifications to retain a water tube spring.
Figure 4B:
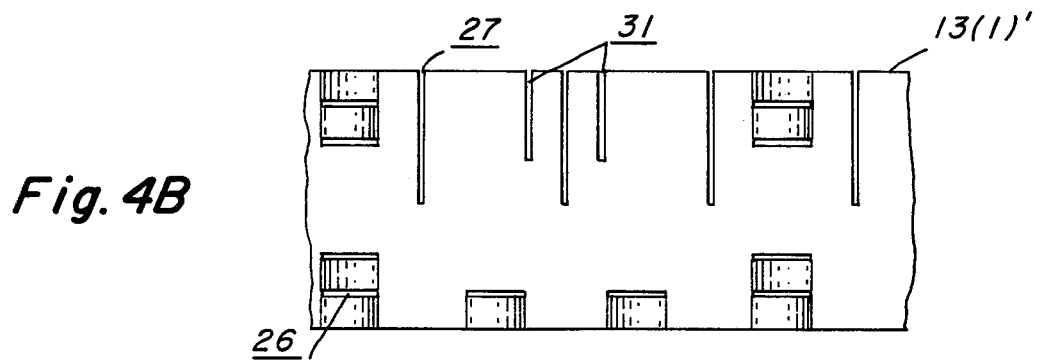

If the spacer 11 is to accommodate oversized water tubes 17, as shown in FIG. 1, the intersecting divider members 13(1)', 13(1)" must be modified from that shown in FIGS. 3A, 3B to retain the ring-shaped spring 21. Details of these modifications are shown in FIGS. 4A and 4B.

In alignment with the intersection of divider members 13(1)' and 13(1)", the divider member 13(1)" is formed with a cutout 29 (FIG. 4A) to receive the ring-shaped spring 21. As shown in FIG. 4B, the divider member 13(1)' is formed with a pair of spaced slots 31 for receiving the spring 21 whereby when the divider members 13(1)' and 13(1)" are interlocked the spring 21 is retained in position.

Figure 5:
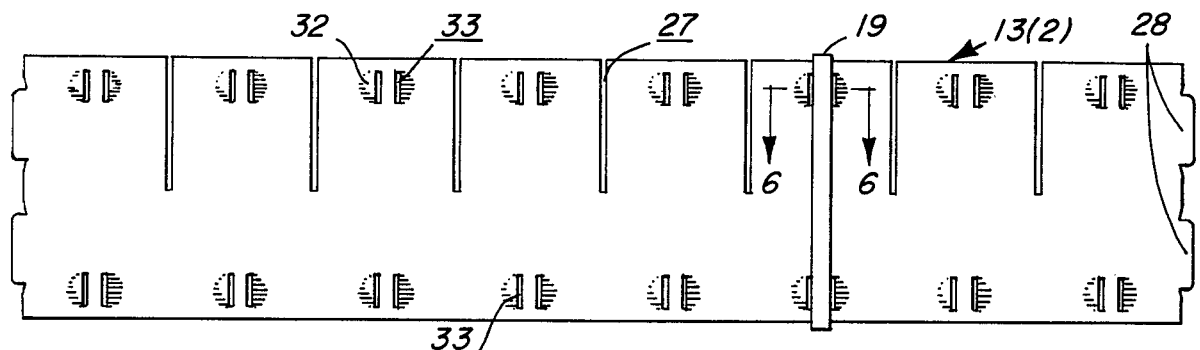
FIG. 5 is a side view of another type of divider member of the spacer of FIGS. 1 and 2.
Figure 6:
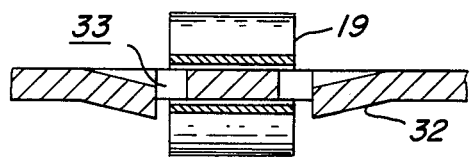
FIG. 6 is a section view illustrating spring retaining louvers.

Details of the divider members 13(2) are illustrated in FIGS. 5 and 6. These divider members provide support for the springs 19, 19'. As in the case of divider members 13(1), the divider members 13(2) are formed with the spaced slots 27 for interlocking with other divider members and with the pairs of tabs 28 at each end for welding into appropriate slots in the peripheral support band 12.

To retain the springs 19, 19' in their proper vertically oriented positions on the divider member 13(2), each spring is captured between upper and lower pairs of projections 32 (see FIG. 6) near the upper and lower edges of the divider member 13(2). The projections preferably are in the form of quarter-spherical louvers.

To form the louvers 32 the divider member 13(2) is first formed with pairs of spaced slits 33 defining the edges of the louvers 32 which face the springs 19, 19'. The springs 19, 19' are then slipped over the divider member 13(2) and each is positioned in alignment with its respective upper and lower pairs of slits 33. The metal of the divider member 13(2) is then deformed outwardly to form the louvers 32. This procedure avoids the installing of the springs over already formed louvers or projections which could overstress the spring material, the theory being that if the springs can be forced over the formed louvers during fabrication of the spacer, they might also slip over the louvers and become mislocated during operation in a reactor. With the procedure of this invention, even if one side of the spring should break during operation in a reactor, it is likely that the spring would remain in its proper position.

Figure 7:
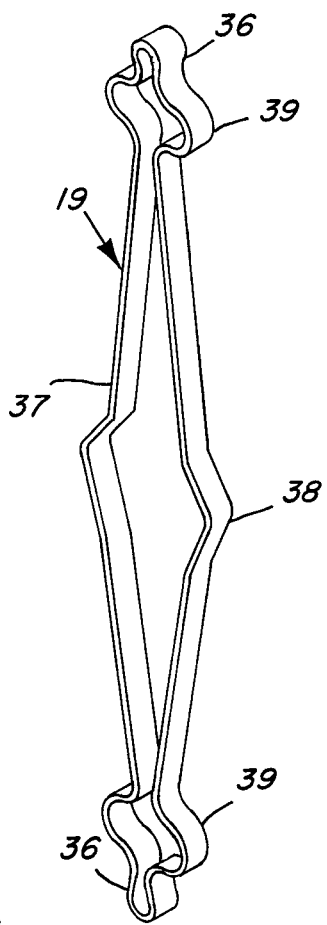
FIG. 7 is an isometric view of a double-sided spring member.

The spring 19 is illustrated in detail in FIG. 7. The spring 19 is a double-sided, continuous-loop member. Conveniently, the stock from which such a spring may be formed is a section of seamless tubing.

The spring 19 is formed with upper and lower minor end portions 36 spaced apart about the thickness of a divider member 13(2) for close fit thereon. Major middle portions 37 are outwardly bowed to extend into the fuel rod passages and are formed with a central apex portion 38 for contact with the fuel rods. Arched intermediate portions 39 extend outwardly to a lesser extent than middle portion 37 for limiting extreme movement of a fuel rod in the direction of the spring 19.

Figure 8:
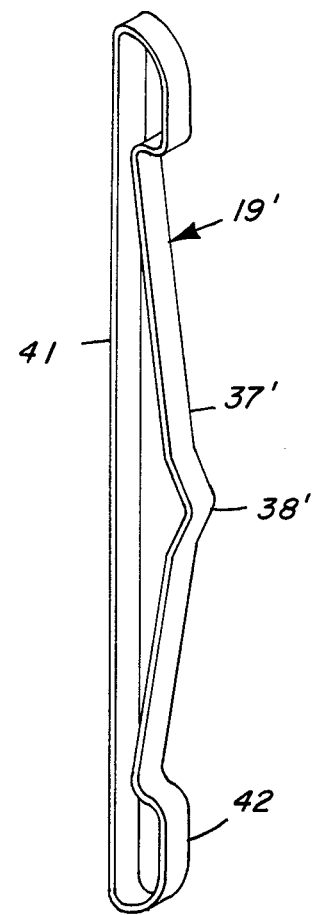
FIG. 8 is an isometric view of a spring with a single spring member.

The spring 19' is illustrated in FIG. 8. This spring provides a single resilient or spring member and it is used adjacent the oversized water tube passages 14' (FIG. 1). This spring has a straight side 41. The other side has a major middle portion 37' and apex portion 38' similar to that of spring 19 (FIG. 7). However, arched end portions 42 of spring 19' are different from the end portions of spring 19.

Because of the straight side 41, the spring 19' as a whole cannot elongate. Therefore, the arched end portions 42 are elongated an amount sufficient to provide the middle portion 37' with a spring constant approximately that of the middle portion 37 of spring 19 while maintaining spring stresses within acceptable levels.

Figure 9A:
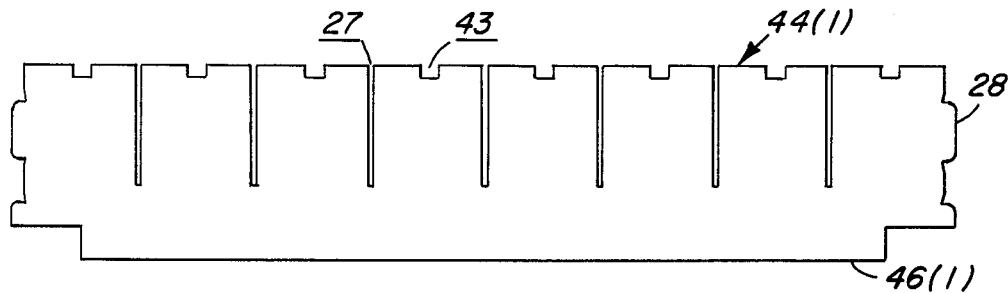
FIGS. 9A, 9B and 9C are side views illustrating an alternate embodiment of a spring retaining divider member.
Figure 9B:
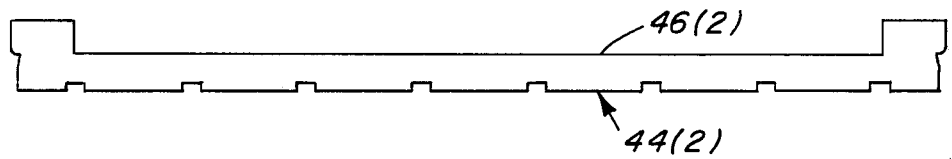
Figure 9C:
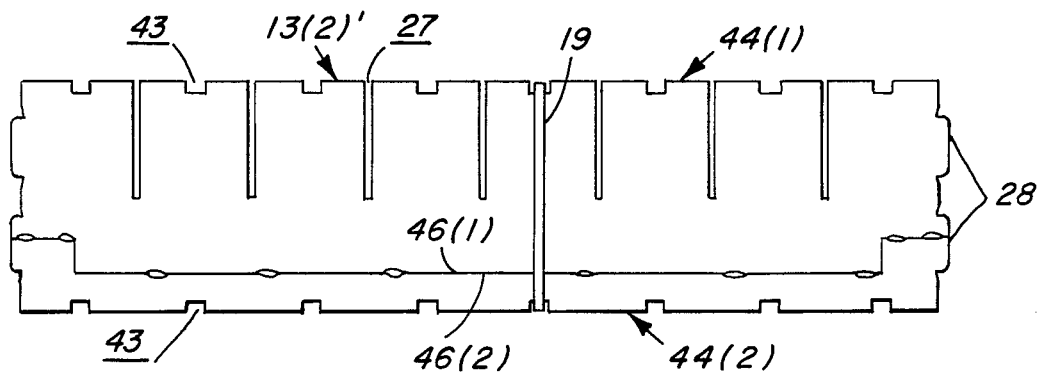

In the embodiment of the invention illustrated in FIGS. 5 and 6, louvers 32 are provided to retain spring 19, 19' in their positions on the divider member 13(2). Illustrated in FIGS. 9A, 9B and 9C is an alternate divider member 13(2)' wherein the spring members 19, 19' are positioned in notches 43 formed in the upper end lower edges of a divider member 13(2)'. (It will be appreciated that for this embodiment the springs 19, 19' will be made somewhat shorter so as to fit down in the notches 43 or, alternatively the height of the divider members 13(1), 13(2) may be made somewhat greater.)

To provide for installation of the springs 19, 19' on the notched divider member 13(2)', this divider member is first formed of separate longitudinally extending pieces including a major piece 44(1) and a minor piece 44(2).

To install the springs 19, 19' on the notched divider member 13(2)', the two pieces 44(1), 44(2) are placed in overlapping relation and the springs 19, 19' are slipped thereover and placed in alignment with the notches 43. The two pieces 44(1), 44(2) are then moved toward opposite ends of the springs 19, 19' to bring the spring ends into engagement with the notches 43 and to bring the inner edges 46(1) and 46(2) of the upper and lower pieces 44(1), 44(2) into abutting relation. These abutting edges are then welded together to form the unified divider member 13(2)', devoid of cutouts, as shown in FIG. 9C.

In the spacer of the invention, the peripheral support band 12 and the divider members 13(1), 13(2) are formed of a material having a low neutron absorption cross section such as a zirconium alloy, for example, Zircaloy-4. The spring members 19, 19', 21 are formed of a material having suitable strength, corrosion resistance and resiliency characteristics such as a nickel alloy, for example, Inconel.

In an example of a spacer of the invention the peripheral support band 12 is about 1.25 inches (31.75 mm) high and about 0.03 inches (0.76 mm) thick. The divider members 13(1), 13(2) are about 1.125 inches (28.6 mm) high and about 0.02 inches (0.5 mm) thick. The springs 19, 19' are about 0.085 inches (2.2 mm) wide and formed of material about 0.013 inches (0.33 mm) thick. The spring 21 is about 0.175 inches (4.5 mm) high of a material about 0.006 inches (0.15 mm) thick.

Thus what has been described is a nuclear fuel element or rod spacer wherein the total amount of material, the amount of high neutron cross section material, the projected area of the spacer structure, and changes in cross section area of the spacer structure are minimized to minimize neutron absorption and coolant/moderator flow resistance.

As compared to prior spacers (for example, as shown in U.S. Pat. No. 3,654,077) the decreased neutron absorption of the spacer of the invention provides in the order of 0.8 percent decrease in reactivity penalty which is equivalent to a fuel enrichment benefit of about 0.0098 percent. The spacer of the invention also provides a decrease in fuel assembly coolant pressure drop of from about 10.6 psi with prior spacers to about 9.7 psi with spacers of the invention or a decrease of nearly 1 psi.

We claim:

1. A nuclear fuel assembly including a spacer for retaining fuel elements in lateral spaced position, said spacer comprising: a structure of divider members assembled together to form respective passages for said elements, each of said divider members having laterally extending upper and lower edges; double-sided springs of generally elliptical shape comprising a continuous, seamless loop of metal supported on said upper and lower edges of at least some of said divider members, said springs being slipped over said upper and lower edges of said divider members before said members are assembled together to form said passages, one side of each of said springs extending into one of said passages and the other side of each of said springs extending into an adjacent one of said passages for engagement with and resilient lateral support of the elongated elements extending through said passages, each said double-sided spring including upper and lower minor end portions for fitting said spring on said divider members, each side of each of said springs being formed with an outwardly bowed major middle portion for extension into one of said passages and including a substantially central apex portion for contact with the element extending through said one of said passages, each side of each of said springs being further formed with upper and lower intermediate portions between said middle and end portions, said intermediate portions being formed with bends arched in the same direction as said middle portion but extending outwardly to a lesser extent than said middle portion thereby to form stops for limiting extreme movement of said element in the direction of said spring; said springs being captured between upper and lower pairs of louvers formed in said some of said divider members near the upper and lower edges thereof after said springs are positioned thereon for retaining said springs in position on said divider members; at least some of said passages being bounded on four sides by divider members with springs mounted on divider members on two adjacent sides of said passage and the divider members on the two opposite sides of said passage each being formed with a pair of vertically spaced rigid projections formed by laterally oriented arched portions of the divider member whereby an element extending through said passage is laterally supported by two spring members and two pairs of rigid projections; a peripheral support band to which the ends of said divider members are secured, said support band forming the outer sides of the peripheral ones of said passages, said support band being formed with upper and lower rigid projections extending into said peripheral ones of said passages, said support band being formed with eight outwardly extending raised portions, two near each corner on each side, for providing spacing between said support band and a surrounding tubular flow channel, said support band being formed with eight inwardly curved upward projections, two near each corner on each side, to serve as lead-ins for installing a tubular coolant flow channel on said assembly.

2. The nuclear fuel assembly of claim 1 wherein at least one of said passages is adapted to receive therethrough an oversized element of greater outside diameter than the majority of said elements and a modified double-sided spring mounted on a divider member adjacent said one of said passages, said modified spring having a substantially straight side lying along the surface of said divider member adjacent said one of said passages whereby the space in said one of said passages for said oversized element is maximized, the other side of said modified spring being outwardly bowed and extending into a passage adjacent said one of said passages.

3. The nuclear fuel assembly spacer of claim 2 wherein two diagonally adjacent passages are adapted to receive oversized elements and wherein a laterally positioned ring-shaped spring member is mounted on the intersecting divider members between said adjacent passages, portions of said ring-shaped spring member extending into said adjacent passages and engaging said oversized elements for resilient lateral support thereof.

* * * * *